United States Patent
Kujawa, Jr.

[15] 3,672,291
[45] June 27, 1972

[54] VENTILATOR UNIT

[72] Inventor: Anthony Kujawa, Jr., Toledo, Ohio
[73] Assignee: Production Research, Inc., Toledo, Ohio
[22] Filed: July 20, 1970
[21] Appl. No.: 56,324

[52] U.S. Cl. .................................................... 98/2.16
[51] Int. Cl. ............................................... B60h 1/24
[58] Field of Search ......................... 98/2, 2.16, 2.17, 2.07; 49/388, 192, 193

[56] References Cited

UNITED STATES PATENTS

| | | | |
|---|---|---|---|
| 3,103,867 | 9/1963 | Hierta | 98/2 |
| 2,443,454 | 6/1948 | Hennessy | 98/2.16 |

*Primary Examiner*—Meyer Perlin
*Attorney*—Richard B. Dence

[57] ABSTRACT

A ventilator mountable as a preassembled unit over a wall opening in a compartment such as, for example, the passenger compartment in a motor vehicle, truck cab, water craft, air craft, mobile home, truck camper, or the like, to regulate the passage or flow of air exchanged through the wall opening between the interior confines of the compartment and the ambient exterior atmosphere. The ventilator unit includes a frame member mountable around the bordering surface of the wall opening and provided with an open central section through which passage of air is regulated in selectively variable manner by a cover member which is shiftable between a closed and various selective open intake and/or exhaust positions by intercooperative means providing selectively shiftable pivot axes for opposite sides or sections of the cover member and cooperating therewith in such manner as to accommodate relatively independent raising and/or lowering of each of such opposite sides or sections of the cover member as well as relatively concurrent raising and/or lowering thereof between open and closed positions.

12 Claims, 8 Drawing Figures

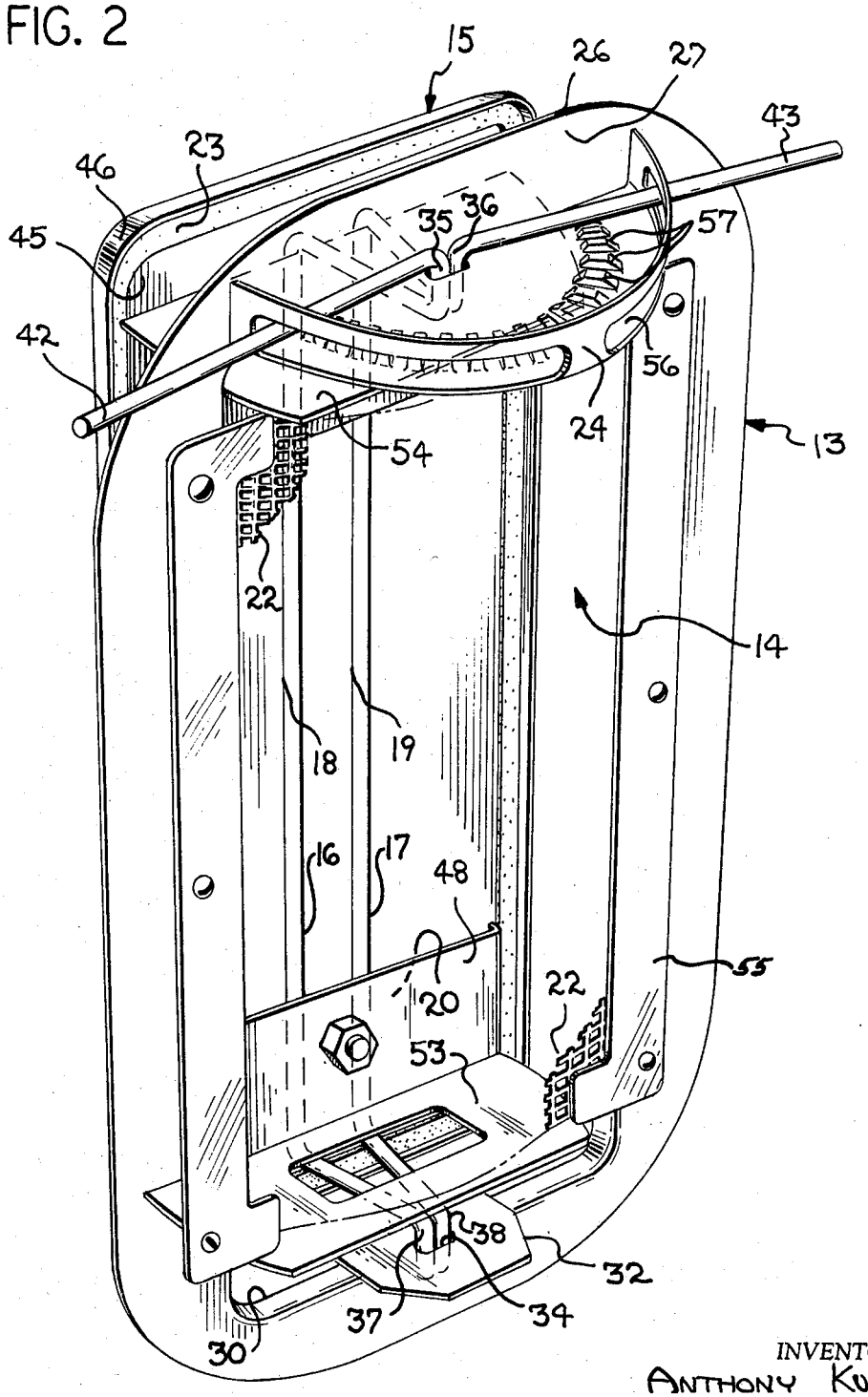

INVENTOR.
ANTHONY KUJAWA, JR.
BY
Richard B. Dence
ATTORNEY

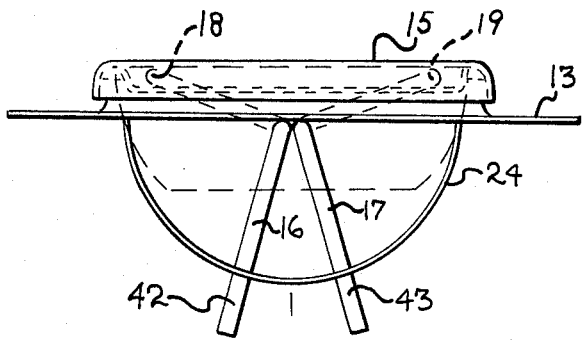
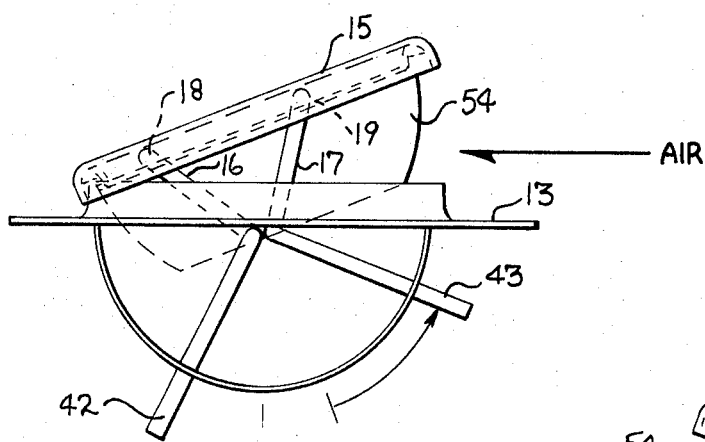
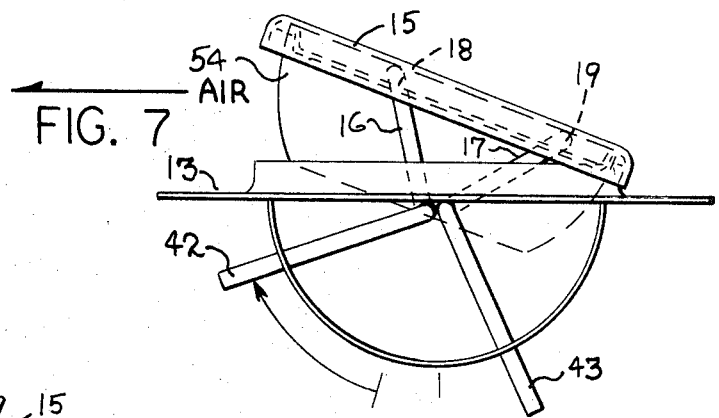
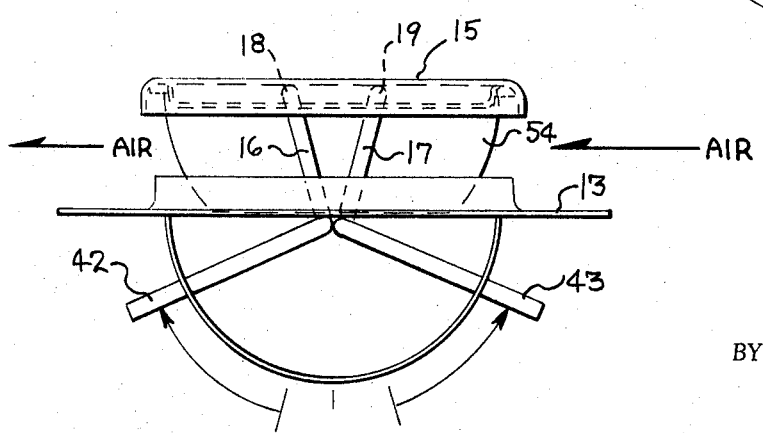

3,672,291

VENTILATOR UNIT

BACKGROUND OF THE INVENTION

Heretofore, many types of devices and structures have been developed and employed for the purposes of providing a simple and efficient means of ventilating passenger compartments of motor vehicles, truck cabs, mobile home units, truck campers, watercraft, aircraft, and the like. Ordinarily, most of such ventilating devices and structures are only capable of functioning effectively as air intake devices which deflect and direct moving air into the compartment. Otherwise stated, such devices and structures are not ordinarily designed to function in such manner as to withdraw, or exhaust, air from the compartment. On the other hand, the few known ventilating devices which have been devised in such manner as to offer selection between air intake and air exhaust capabilities ordinarily employ complex operative mechanisms which are relatively expensive and difficult to manufacture and assemble on a production line basis. Above all, most of the latter types of devices are frequently subject to jamming and faulty operation especially after prolonged use and exposure to inclement weather conditions. No less important, among the relatively few devices which provide mechanisms suitable for selection between air intake and air exhaust, none of commercial significance are known which incorporate into one simply constructed ventilator unit structural and functional features which permit the ventilator unit to be selectively adjustable to provide alternative air intake and air exhaust as well as simultaneous air intake and air exhaust. Moreover, no commercially significant ventilator units are known which, in addition to offering the aforementioned capabilities, are also capable of being selectively adjustable to accommodate selective variation in the relative extent of air being concurrently admitted and exhausted by the ventilator unit. Consequently, a substantial need has been found to exist for a commercially feasible ventilator unit which employs a relatively simple structure suitable for production line fabrication and assembly, and employs relatively few operably movable parts, while being capable of functioning smoothly and affording substantial ventilative selectivity as an air intake and air exhaust vent, and while incorporating design features especially well-suited for employment in numerous different embodiments such as automobiles, trucks, mobile homes, truck campers, watercraft, aircraft, and the like.

BRIEF SUMMARY OF THE INVENTION

Briefly, the ventilator unit of the present invention is designed and constructed in such manner that the unit features a substantial degree of overall selectivity and adjustability in ventilation by means of a simple but durable structural design involving relatively few moving parts and mechanisms. In broad aspect, the ventilator unit comprises a frame member having an open central section mountable over a wall opening through which ventilation is desired. Arranged in overlying relationship with the open central section there is a cover member or hood, which through the use of novel operative means is shiftably carried for selectively adjustable movements between a closed and various open intake and/or exhaust positions in response to selective actuation of such operative means. The operative means for shiftable movements of the cover member includes means providing a pivotal axis for each of two opposite sides or sections of the cover member; such operative means being capable of being selectively shifted in such manner so as to shift the pivotal axes towards and away from each other through an arcuate path of travel overlying the open central section of the frame member. Means are also provided for imparting selectively adjustable movements to the pivotal axes in cooperative relationship with means for intercoordinating the movements of the pivotal axes relative to each other in such manner that each pivotal axis affords a pivot for one side or section of the cover member in response to arcuate movement of the other pivotal axis.

In more limited aspects, the operative means preferably includes a pair of crank arms pivotally mounted upon the frame member and arranged to individually pivot in generally mirror image relationship towards and away from each other. The crank arms, in turn, provide a movable interconnection between the cover member and the frame member by having an eccentrically offset section or portion slidably received within a guide track on the cover member wherein arcuate pivotal movements of each of the crank arms is translated in such manner that movement of each crank arm will cause the cover to pivot about the other crank arm. Otherwise stated, each crank arm provides a pivotal axis about which to pivot the cover member in response to pivotal movement supplied to the other crank arm. Thus, by virtue of such construction the cover member is enabled to be pivoted about either or both of two pivotal axes which in turn are each selectively shiftable through arcuate paths of travel. As a result, and as will be better understood from the ensuing detailed description and the drawings, the cover member of the ventilator unit is capable of being smoothly shifted between a closed position and a wide variety of selectively adjustable open intake and/or exhaust positions by a simple manipulation of a pair of crank arms pivotally and slidably interconnecting the cover member and frame member. As a further result, the ventilator unit is exceptionally compact in design and readily adapted to accommodate such other desirable features as insect screening and means for locking the cover member in selected position.

In accordance with the above, a principal objective of the present invention is the provision of a ventilator unit which is designed to be mountable over a wall opening and operating in improved manner for the purpose of regulating the passage of air through such wall opening.

Another objective of the present invention is the provision of a ventilator unit capable of exhibiting the characteristics of the last-mentioned objective by means of relatively simple, durable and compact design features readily susceptible to relatively low cost commercial manufacturing operations.

Another objective of the present invention is the provision of a ventilator unit having improved operational characteristics and which is designed for highly diversified use as a ventilator unit for mobile homes, truck campers, passenger motor vehicles, truck cabs, watercraft, aircraft and the like.

A further but no less important specific objective of the present invention is the provision of a ventilator unit especially designed to regulate the passage of air through a wall opening leading into a compartment such as the passenger compartment of a motor vehicle, truck cab, watercraft, aircraft, truck camper, mobile home, or the like and which is characterized by having a shiftable cover member capable of being shifted about variably adjustable axes in such manner that oppositely disposed sides or sections of the cover member may be independently or concurrently raised or lowered between closed and various selectively adjustable open air intake and/or air exhaust positions to thereby effect an improved manner of ventilation of the compartment.

Other and additional objectives, features and advantages of the present invention will become readily apparent to those ordinarily skilled in the art from the ensuing detailed description taken in conjunction with the annexed four sheets of drawings whereon one, among others, of the preferred embodiments of the invention is depicted.

BRIEF DESCRIPTION OF DRAWINGS

FIG. 2 is a partly fragmentary perspective view of a ventilator unit embodying the structural and functional concepts of the present invention.

FIG. 5 represents an end view of the ventilator unit as viewed in the direction indicated by the reference plane 5—5 in FIG. 3, and with the ventilator unit selectively positioned in a lowered or closed relative position.

FIG. 6 is an end view similar to FIG. 5, but, for comparative purposes of depicting the operational characteristics of the ventilator unit, showing the relative position of the ventilator components when the ventilator unit is positioned in a selectively variable raised or open air intake position and closed air exhaust position.

FIG. 7 is also a view similar to FIG. 5 but depicting the relative positioning of the ventilator components when the ventilator unit is positioned in a selectively variable raised or open air exhaust position and closed air intake position.

FIG. 8 is another view similar to FIG. 5, but depicting the relative positioning of the ventilator components when the ventilator unit is positioned in one of its selectively variable raised or open air intake and open air exhaust positions.

DETAILED DESCRIPTION OF THE INVENTION

With reference to the drawings, the ventilator unit 10 of the present invention is, for illustrative and descriptive purposes only, shown installed in one, among many, of the preferential embodiments, such as a motor vehicle 11, in which it is especially suitable for use. More particularly in this regard, it will be appreciated that the ventilator unit of the invention is so constructed and designed as to render it well-suited for use in many other embodiments as well as motor vehicles. For example, to name a few of such embodiments, the ventilator unit is also designed for use with truck cabs, mobile homes, truck campers, watercraft and aircraft, as well as numerous other mobile or stationary embodiments wherein compartmental ventilation is desired or necessitated; provided the compartment to be ventilated is susceptible to being provisioned with a wall opening leading to or communicating with the ventilator unit. Such a wall opening is shown in the illustrated embodiment as being provided in and extending through the side cowling 12 of the motor vehicle 11 and leading into the interior passage compartment thereof.

Figure 1:
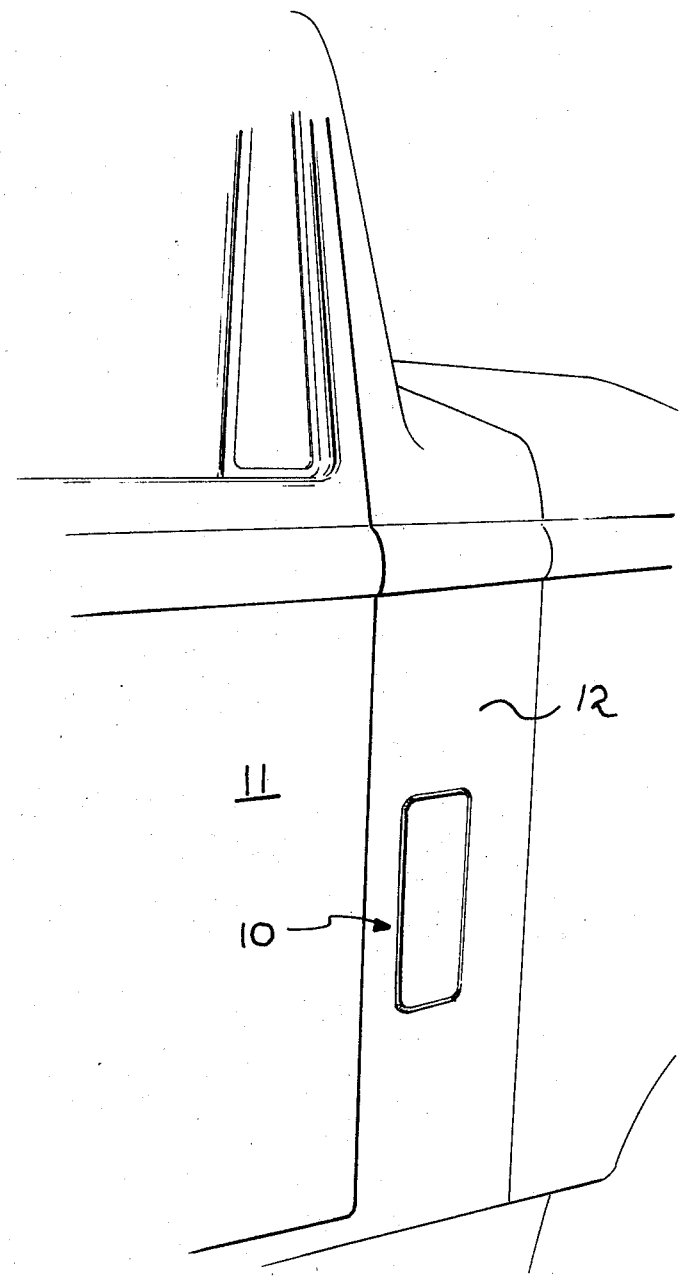
FIG. 1 is a fragmentary perspective view of the present invention shown in a preferred embodiment mounted on a motor vehicle.
Figures 3, 4:
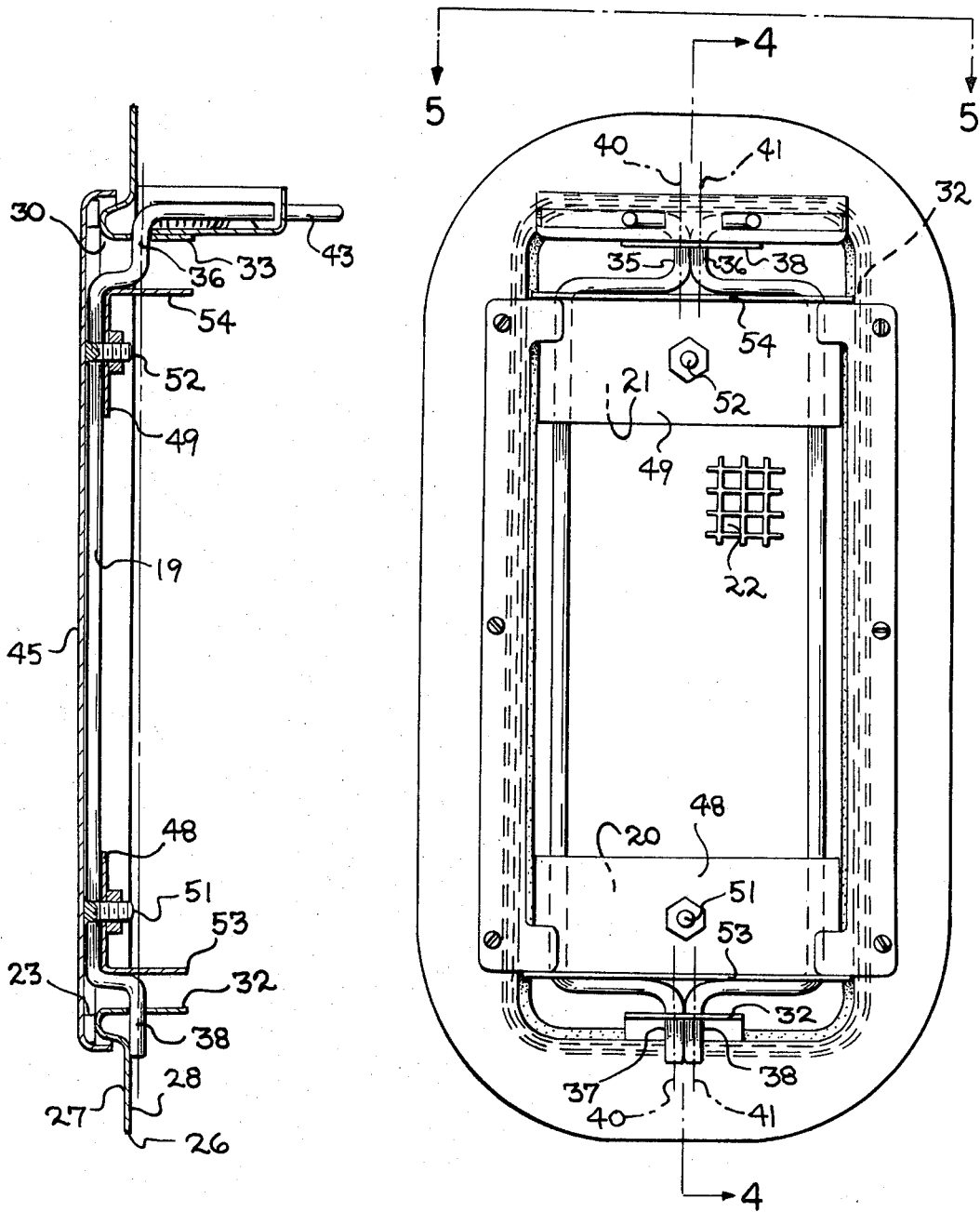
FIG. 3 illustrates a bottom view of the ventilator unit shown in FIG. 2, with a portion of the unit broken away to provide clarity of illustration.
FIG. 4 depicts a sectional view taken along and viewed in the direction of sectional plane 4—4 shown in FIG. 3.

Briefly, as best shown in FIGS. 2 and 3, the general manner of construction of the ventilator unit is such that it includes a generally rectangular frame member 13 provided with a hollow or open central section, as at 14, over which a hatch or cover member 15 is carried by intercooperative means such as crank means 16 and 17 are for selectively shiftable movements between closed and various alternative open intake and exhaust positions overlying the open central section 14. The crank means 16 and 17 are pivotally mounted from the frame member 13 and respectively have eccentrically disposed central sections in the form of lever arm sections 18 and 19 which in turn are slidably received in one or more slide tracks 20 and 21 on the cover member for interconnection of the cover member 15 and frame member 13 and for travel to and fro along an arcuate path in response to operational force applied thereto for the purposes of operably opening, closing or other selective altering of the intake or exhaust positions of the cover member. As further shown, the ventilator unit 10 also is preferably designed to accommodate desirable structural features which, without affecting the basic operability of the ventilator unit, add to its overall utility. One such feature is the provision of a screen member 22 which, although shown as being broken away for purposes of clarity of illustration, is superimposed over and spans the open central section 14 of the frame member 13 and precludes the passage of insects, foreign objects and the like through the ventilator unit and wall opening. Another desirable feature is the provision of sealing means 23 for sealing the cover member 15 against the frame member 13 while the cover member is positioned in closed position. A further highly desirable feature is the provision of selective position locking means 24 which operates to releasably and selectively lock the cover member 13 in the closed or any of various selective open exhaust and/or intake positions.

In more detailed respects, the frame member 13 is preferably of metallic construction suitable for fabrication in accordance with conventional metal stamping or other conventional, commercial fabricating procedures. Of course, the frame member 13, as with other parts to be hereinafter described, while being preferably fabricated from relatively light or medium gauge sheet metal may also be fabricated from aluminum, plastic, or most any other relatively rigid structural material. In the form illustrated, the frame member 13 is generally rectangular in peripheral configuration and includes a continuous generally rectangular mounting flange 26 arranged in surrounding relationship with the open central portion, or section 14, and having an underside surface 27 which may be smooth, as shown, or otherwise adaptably contoured to conform to and seat snugly against the wall surface on which the ventilator unit 10 is to be mounted. On the oppositely facing upperside surface 28, the mounting flange is provided with an upstanding ledge or lip 30 extending continuously around and bordering the open central section 14.

Pivot mountings for the crank means 16 and 17 are provided in the form of pivot mounting brackets 32 and 33 respectively secured to opposite ends of the frame member 13 in generally right angular relationship to the underside surface 27 thereof and in closely adjacent proximity to the open central section 14. Being so situated, the pivot mounting brackets 32 and 33 are adapted to project through the open central section 14 into the wall opening around which the mounting flange 26 is designed to be mounted.

The pivot mounting brackets 32 and 33 are provided with means, such as oblong journal openings at 34 and 35, respectively, which are deployed in axially aligned relationship to receive and pivotally support paired opposite axially aligned end portions of the crank means 16 and 17 for pivotal movements about adjacent, mutually parallel pivot axes such as axes 40 and 41, indicated by broken lines in FIG. 3. As best illustrated in FIGS. 2 and 3, the pivot axes 40 and 41 are disposed in underlying essentially centered relationship with and span the open central section 14 of the frame member 13.

Crank means 16 and 17 are preferably constructed in the form of elongated rods or arms of circular cross section. More specifically, each includes an eccentrically offset bight portion conveniently referred to respectively as a lever arm portion or section 18 and 19 disposed in longitudinally parallel, offset relationship with its respective pivot axes, whereby each of the lever arm sections is mounted to pivot through an arcuate path of travel. As illustrated, the inner pivot mounting portions or sections 35 and 36 of crank means 16 and 17 respectively, are maintained in axial side-by-side relationship in pivot mounting bracket 33 and similarly the opposite outer pivot mounting portions or sections 37 and 38 are pivotally maintained in axial side-by-side relationship in pivot mounting bracket 32. So mounted, the crank means 16 and 17 are individually arranged to pivot in mirror image fashion about mutually adjacent and parallel pivot axes 40 and 41, respectively, so that each of the offset lever arm sections 18 and 19 travels eccentrically to and fro through an arcuate, essentially quandrantal path of travel towards and away from each other.

Manually operable means for imparting the desired extent and direction of pivotal movement to each of the crank means 16 and 17 is provided by handles 42 and 43 located at the innermost ends of each of the crank means. As shown, the handles 42 and 43 may be provided in the form of laterally bent extensions of the inner pivot mounting sections 35 and 36 which, as best indicated in FIGS. 5–8, are bent in such manner that the handles pivot towards each other as the lever sections 18 and 19 pivot away from each other, and conversely to pivot away from each other as the lever sections pivot towards each other.

The cover member 15, or hatch, is formed with a generally flat central body portion 45 of a size and shape designed to span and conform to the general configuration of the central open section 14 of the frame member 13. Along the marginal edge portion the cover member is bent over to define a continuous, depending, peripheral skirt 46, or coaming, shaped to overhang and encompass the upstanding continuous lip 30 on the frame member 13 when the cover member 15 is superimposed over the open central section 14 in a relative closed position, as illustrated in FIG. 5. Means with which to slidably interconnect the cover member 15 with the crank means 16 and 17 is provided in the form of a slide track stretching across the underside of the cover member 15. Forming the slide track are one or more retainer plates, such as the illustrated pair of interspaced retainer plates 48 and 49. As shown, the retainer plates are deployed in cross wise relation to the pivotal axes of the crank means 16 and 17 and are suitably secured in spaced parallel relationship to the underside surface of the cover member 15, as by lock nuts threaded on stud bolts 51 and 52 projecting from the underside of the cover member 15. As thus secured, the retainer plates 48 and 49 cooperate with the underside surface of the cover member 15 to respectively define a guide track such as guide tracks 20 and 21 in which to slidably receive the lever arm sections 18 and 19 of the crank means 16 and 17 and thus interconnect the cover member 15 with the frame member 13 while at the same time accommodating relative crosswise sliding movements of the lever arm sections 18 and 19 while the latter are pivotally shifted through an arcuate path of travel in response to pivotal movement of the crank handles 42 and 43.

Alignment means are also provided for maintaining the cover member in properly registered alignment with the frame member during and throughout movement of the cover member between its closed and various alternative open positions. Such alignment means are preferably provided in the form of end plates 53 and 54 secured at opposite respective ends of the underside surface of the cover member 15 and disposed in perpendicular relation to the pivot axes 40 and 41. The end plates 53 and 54 are each of sufficient length to project into and nest, or cradle, snugly within the open central section 14 of the frame member 13. As illustrated, opposite edges of each of the end plates are convexly rounded to provide a radius of curvature permitting the end plates to pivot through a path passing closely adjacent to or in tangential frictional contact with the edge of the lip 30 of the frame member 13 when, as depicted in FIGS. 6 and 7, one of the sides of the cover member 15 is in closed relative position while the other side is being pivoted between open and closed positions.

Thus, the end plates 53 and 54 function to restrain the cover member against excessive endwise and sideways movements relative to the frame member 14 and against misalignment during movements thereof between open and closed positions.

To more fully ensure against the entrance of moisture and unwanted drafts of air through the ventilator unit when the cover member is in closed position, sealing means 23 may be conveniently provided in the form of suitable weather stripping carried on or secured to the underside surface of the cover member 15 at a marginal location adjacent to the skirt and designed to coincide with and sealingly bear against the lip 30 of the frame member 13 when the cover member 15 is in closed position.

To prevent the entrance of insects and other unwanted foreign objects apt to be carried through the ventilator unit when in an open position, screening 22 may be provided. As shown, the screening may be conveniently superimposed across the open central section 14 and suitably attached to the underside surface 27 of the frame member mounting flange 26 as by suitable mounting strips 55, shown in FIG. 2.

To assure the retention of the cover member 15 in the particular closed or open alternative position which has been selected, selective position locking means 24 are provided. Such selective position locking means includes a positioning plate 56 provided with a plurality of detents or stops 57 arranged in arcuate array to intercept the handles 42 and 43 during pivotal movements thereof. The relative resiliency or spring action of the handles 42 and 43 is such that under relatively light manual urging the handles 42 and 43 may be raised slightly and easily manipulated past the stops 57 to the desired selected position. The stops, however, will effectively resist movement of the handles 42 and 43 in response to force indirectly applied thereto through the cover member in such manner as may occur as the result of wind pressure or manual pressure applied against the cover member 15. Thus, the desired positioning of the cover member 15 may be maintained even when the cover member is subjected to the force of high velocity wind. Also the danger of unwanted tampering with the positioning of the cover member is effectively avoided.

The manner of operation of the ventilator unit is best depicted in FIGS. 5-8. To shift the cover member 15 from a closed position, such as shown in FIG. 5, to a raised air intake position shown in FIG. 6, handle 43 is pivoted outwardly in a counterclockwise direction and causes eccentric lever arm section 19 thereof to pivot inwardly along an arcuate, counterclockwise path of travel and to concurrently slide within the slide tracks 20 and 21, and thereby pivot or swing the cover member 15 away from the frame member 13 and about the pivotal axis provided by the other eccentric lever arm section 18. Alternatively, to shift the cover member 15 from a closed position to an air exhaust position, as indicated in FIG. 7, the handle 42 is pivoted in a clockwise direction and thereby causes eccentric lever arm section 18 to pivot inwardly along an arcuate, clockwise path of travel and to concurrently slide within the slide tracks 20 and 21 and thereby concurrently swing or pivot the cover member 15 away from the frame member 13 and about the eccentric lever arm section 19 on the opposite side of the cover member. Thus, as each lever arm is raised or lowered it not only correspondingly opens or closes one side of the cover member, but also serves as a shifting pivot axis about which to pivot the opposite side of the cover member 15. Thus, as best illustrated in FIG. 8, counterclockwise movement of handle 43 coupled with clockwise movement of handle 42 will cause each side of the cover member 15 to resultingly pivot and be shifted to a position providing both air intake and air exhaust. Moreover, when both handles 42 and 43 are concurrently and equally pivoted at the same rate the cover member 15 will shift in a linear path between the closed and open positions shown in FIGS. 5 and 8 respectively.

Thus, as will be understood from the foregoing description and the drawings, the ventilator unit of the present invention combines, among others, such features as simplicity of structural design, durability and operational selectivity.

I claim:

1. A ventilator unit mountable over a wall opening to regulate the passage of air through said wall opening and comprising
   a frame member mountable around said wall opening and provided with an open central section,
   a cover member for said open central section,
   means supporting said cover member with the underside surface thereof in overlying relationship with said frame member and for shifting said cover member between alternative closed and open positions relative to said open central section of said frame member, said last-mentioned means including a lever arm section pivotally mounted from said frame member for travel to and fro within said open central section along an arcuate path between a position adjacent to said frame member and at least one other position more remote from said frame member,
   said cover member having means cooperating with the underside surface thereof to define a slide track receiving said lever arm section and providing a slide track path paralleling the underside surface of said cover member and accommodating sliding movement of said lever arm section relative to said cover member as said lever arm section is being pivoted between said positions, said closed position of said cover member being coordinated to correspond to the position of said lever arm section when the latter is adjacent said frame member and said open position of said cover member being coordinated to correspond to a position of said lever arm section more remote from said frame member.

2. A ventilator unit mountable over a wall opening to regulate the passage of air through said wall opening and comprising a frame member mountable around said mountable opening and provided with an open central section, a cover member for said open central section, means disposed on opposite respective sides of said cover member pivotally mounting said cover member in overlying relationship with said frame member and providing a pair of pivotal axes for pivotable movements of each of said opposite sides of said cover member between closed and alternatively variable open positions relative to said open central section of said frame member, said last-mentioned means including a pair of pivotable lever arm sections slidably deployed in guide tracks on said cover member and providing said pivotal axes, said guide tracks accommodating sliding relative movements of said lever arm sections and said pivotal axes towards and away from each other thereby varying the relative spacing between said lever arm sections and said pivotal axes while the same are being pivoted to shift said cover member between said closed and open positions.

3. A ventilator unit as defined in claim 2, wherein each of said lever arm sections provides a pivotal axis about which to pivot said cover member in response to movement of the other of said lever arm sections.

4. A ventilator unit mountable over a wall opening to regulate the passage of air through said wall opening and comprising a frame member mountable around said wall opening and provided with an open central section, a cover member for said open central section, means disposed on opposite respective sides of said cover member pivotally mounting said cover member in overlying relationship with said frame member and providing a pair of pivotal axes for pivotable movements of each of said opposite sides of said cover member between closed and alternatively variable open positions relative to said open central section of said frame member, said last-mentioned means including a pair of pivotable lever arm sections independently pivotable relative to each other and slidably deployed in guide tracks on said cover member accommodating sliding movements of each of said lever arm sections towards and away from each other as each is being pivoted to shift said cover member between said closed and open positions.

5. A ventilator unit as defined in claim 4, wherein pivotal movement of one of said lever arm sections pivotally shifts one side of said cover member relative to said frame member and wherein movement of the other of said lever arm sections pivotally shifts the other side of said cover member relative to said frame member.

6. A ventilator unit as defined in claim 5, wherein movement of each of said lever arm sections pivotally shifts each opposite side of said cover member relative to said frame member.

7. A ventilator unit as defined in claim 4, wherein said frame member and said cover member are provided with cooperatively aligned seating surfaces on said cover member and said frame member, whereby to snugly seat said cover member against said frame member when said cover member is positioned in closed position relative to said frame member.

8. A ventilator unit to regulate the passage of air admitted and exhausted through a wall opening comprising, in combination:

a frame member defining an open central section through which to accommodate the passage of air through said wall opening, a cover member for selectively regulating the passage of air through said open central section of said frame member, crank means for operatively shifting the positioning of said cover member relative to said open central section of said frame member, said crank means including a pair of axially elongated crank arms longitudinally spanning a medial region of said open central section and mounted from opposite ends of said frame member for pivotal movements about mutually tangential first pivotal axes, intermediate the pivotal mountings thereof said crank arms having elongated eccentric sections radially offset respectively from said pivotal axes and providing a second pair of pivotal axes, said elongated eccentric sections being arranged to pivot about said first pivotal axes between lowered positions with said elongated eccentric sections being offset in substantially oppositely disposed directions and raised positions with said elongated eccentric sections being offset in substantially similarly disposed directions, said cover member being provided with a slide track defining a slide track path disposed transversely of said first pivotal axes and containing said lever arm sections therein and accommodating slidable guided movements along said slide track path, said slide track also accommodating pivotal movements of said cover member about each of said lever arm sections and thereby about each of said second pair of pivotal axes, means for independently pivoting each of said crank means about said first pair of pivotal axes and thereby independently pivotally shifting each of said lever arm sections and each of said second pair of pivotal axes within said guide track, whereby to pivotally urge said cover member between closed and open positions corresponding respectively to said lowered and raised positions of said elongated eccentric sections of said crank means.

9. A ventilator unit as defined in claim 8, wherein one of said crank arms raises and lowers one side of said cover member relative to said frame member and wherein the other of said crank arms raises and lowers an opposite side of said cover member relative to said frame member.

10. A ventilator unit as defined in claim 8, including manipulating means for selectively manipulating each of said crank arms independently of each other.

11. A ventilator unit as defined in claim 10, including means for releasably locking said manipulating means in a plurality of alternative positions corresponding to selectively variable closed and open positions of the cover member.

12. A ventilator unit as defined in claim 8, including screening superimposed over said open central section for preventing the passage of insects therethrough.

* * * * *